(12) United States Patent
Chen

(10) Patent No.: US 8,882,135 B1
(45) Date of Patent: Nov. 11, 2014

(54) BALL CART STRUCTURE

(71) Applicant: Benjamin Chen, Taichung (TW)

(72) Inventor: Benjamin Chen, Taichung (TW)

( * ) Notice: Subject to any disclaimer, the term of this patent is extended or adjusted under 35 U.S.C. 154(b) by 0 days.

(21) Appl. No.: 13/948,219

(22) Filed: Jul. 23, 2013

(51) Int. Cl.
*B62B 1/00* (2006.01)
*B62B 3/02* (2006.01)

(52) U.S. Cl.
CPC .......................................... *B62B 3/02* (2013.01)
USPC ....................................................... 280/651

(58) Field of Classification Search
USPC ................. 280/47.17, 47.18–47.19, 47.2, 280/47.24–47.28, 63, 79.2, DIG. 6
See application file for complete search history.

(56) References Cited

U.S. PATENT DOCUMENTS

| | | | | |
|---|---|---|---|---|
| 1,769,418 A * | 7/1930 | Cooper et al. | ................. | 280/645 |
| 3,207,526 A * | 9/1965 | Brodeck | ........................ | 280/652 |
| 3,992,038 A * | 11/1976 | Guadano, Sr. | ................ | 280/659 |
| 5,273,298 A * | 12/1993 | Brown, Sr. | ................. | 280/47.19 |
| 5,988,671 A * | 11/1999 | Abelbeck et al. | ............. | 280/649 |
| 6,398,040 B1 * | 6/2002 | Gregory | ......................... | 211/14 |
| 8,162,349 B1 * | 4/2012 | Roselle | ........................ | 280/654 |
| 2002/0070532 A1 * | 6/2002 | Harrison et al. | ............. | 280/647 |
| 2003/0037812 A1 * | 2/2003 | Stewart et al. | .................. | 135/96 |

* cited by examiner

*Primary Examiner* — John Walters
*Assistant Examiner* — James Triggs
(74) *Attorney, Agent, or Firm* — Alan Kamrath; Kamrath IP Lawfirm, P.A.

(57) ABSTRACT

A ball cart structure essentially includes a frame for positioning a bag and positioning units disposed on the frame. The positioning units position and restrict deformation of the frame when the frame is unfolded to be in use or is folded to be stored, to enhance the stability and user safety of the frame in use and render it convenient to store the frame.

4 Claims, 10 Drawing Sheets

BALL CART STRUCTURE

BACKGROUND OF THE INVENTION

1. Field of the Invention

The present invention relates to ball cart structures and, more particularly, to a storage component positioned by unfolding or pivotal rotation.

2. Description of Related Art

A typical ball cart 10, which is shown in FIGS. 1, 2, essentially comprises a frame 11 pivotally rotatable and unfoldable or foldable to be stored and a bag 12. The frame 11 is unfolded to operate in conjunction with the bag 12. The frame 11 has four L-shaped block-like positioning corner ends 111. The bag 12 has four positioning portions 121 corresponding in position to and engaged with the positioning corner ends 111, respectively. The bag 12 is disposed around and positioned at the positioning corner ends 111 by the positioning portions 121. The positioning corner ends 111 are made by sewing. In the situation where the bag 12 contains plenty of balls, the suture at the positioning corner ends 111 bears the weight of the balls and thus tends to damage and sever. As a result, the bag 12 is limited in its maximum carrying weight, susceptible to damage, and has a short service life. Furthermore, the frame 11 is not equipped with any positioning structure. As a result, after the frame 11 has been folded and stored, it is necessary to use a storage sack 13 to prevent the frame 11 from unfolding freely in order to open. Accordingly, the ball cart 10 lacks ease of use.

SUMMARY OF THE INVENTION

The present invention provides a ball cart structure with a view to overcoming a drawback of the prior art in that it is not only impossible to position the frame of a conventional ball cart but also inconvenient to fold and store the frame.

In order to achieve the above and other objectives, the present invention provides a ball cart structure comprising:

a frame comprising four supporting rods arranged rectangularly and pivotally connected to four fork-like rod sets, respectively, with each supporting rod provided slidably with a sliding block having an installation hole, with an end of each supporting rod forming a position-limiting protruding post, with each said fork-like rod set disposed between two said supporting rods, with each fork-like rod set comprising two pivotal rods crossing each other and connecting pivotally to each other, with two ends of each said pivotal rod connecting pivotally to the supporting rod and the sliding block, respectively, and with the supporting rod having a first positioning hole and a second positioning hole;

a positioning unit disposed on the sliding block and comprising a static element, an insertion element, a spring, a sleeve, and an operating element, with the static element being a screw nut corresponding in position to the installation hole and fixed to the sliding block, with the insertion element having two ends, with the two ends being an inserting end and a driving end, respectively, with the insertion element having a shoulder portion disposed between the two ends of the insertion element, with the sleeve having a hollow core structure and having a head end and a fixing end, with the fixing end having a receiving portion, with the receiving portion having an abutting surface, with the driving end penetrating the spring and inserted into the receiving portion, such that two ends of the spring abut against the shoulder portion and the abutting surface, respectively, with the driving end of the insertion element penetratingly protruding from the head end to connect fixedly to the operating element, and with the positioning unit fixed to the installation hole by the fixing end of the sleeve, and a bag comprising a receiving component, a flexible element, and four positioning portions, with a rim of the receiving component coupled to the positioning portions by the flexible element, with each said positioning portion having a through hole, and with the bag penetratedly coupled to the position-limiting protruding posts through the through holes.

With the positioning unit disposed on the sliding block, the positioning unit pulls and unfastens or is released and inserted into the positioning holes to be positioned, thereby positioning the frame, enhancing the user safety and stability of the ball cart structure in operation, and rendering it convenient to store the ball cart structure not in use.

DETAILED DESCRIPTION OF THE EMBODIMENTS OF THE INVENTION

Figure 1:
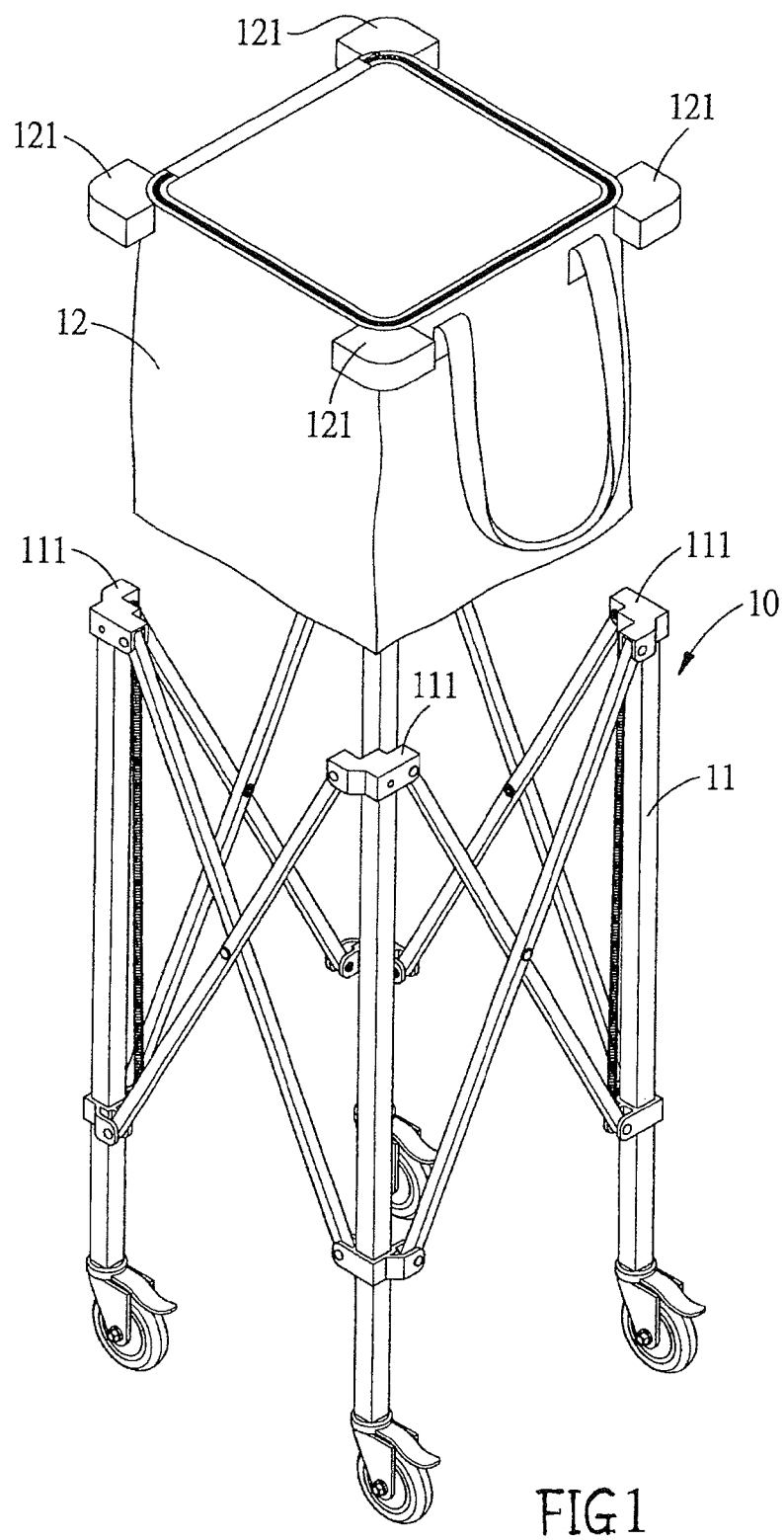
FIG. 1 (PRIOR ART) is a schematic view of the structure of a conventional ball cart.
Figure 2:
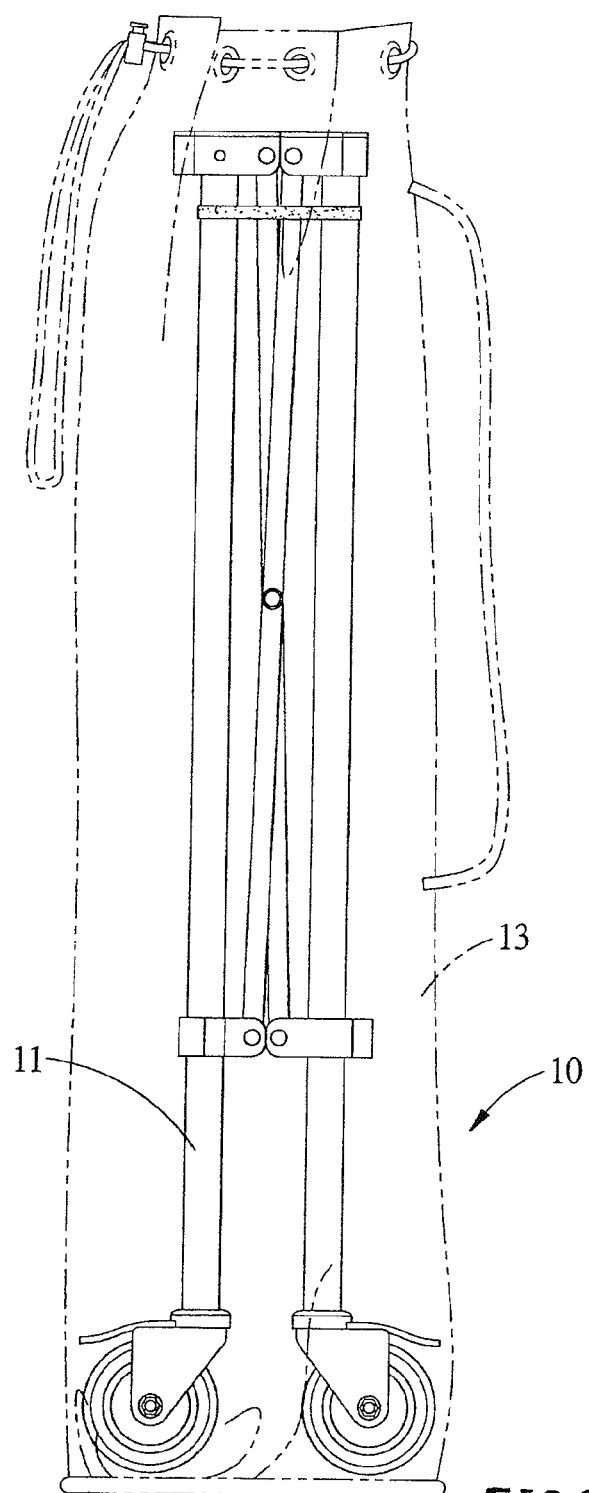
FIG. 2 (PRIOR ART) is a schematic view of the storage of the conventional ball cart.

Referring to FIG. 3 through FIG. 10, there are shown diagrams of a ball cart structure in a preferred embodiment of the present invention. The ball cart structure comprises a frame 20, a positioning unit 30, and a bag 40.

The frame 20 comprises four supporting rods 21 arranged rectangularly and pivotally connected to four fork-like rod sets 22, respectively. A sliding block 23 is slidably disposed on each supporting rod 21. One end of each supporting rod 21 forms a position-limiting protruding post 211 having a position-limiting neck portion 212. A pulley 24 is disposed at the other end of each supporting rod 21. Each fork-like rod set 22 is disposed between two said supporting rods 21. Each fork-like rod set 22 comprises two pivotal rods 221 which cross each other and connect pivotally to each other. The two ends of each pivotal rod 221 connect pivotally to the supporting rod 21 and the sliding block 23, respectively. The supporting rods 21 move closer to or away from each other because of the pivotal rotation of the pivotal rods 221 and the sliding of the sliding blocks 23 on the supporting rods 21. A first positioning hole 213 and a second positioning hole 214 are disposed on one said supporting rod 21. The sliding block 23 on the supporting rod 21 having the first positioning hole 213 and the second positioning hole 214 has an installation hole 231.

The positioning unit 30 is disposed on the sliding block 23 having the installation hole 231. The positioning unit 30 comprises a static element 31, an insertion element 32, a spring 33, a sleeve 34, and an operating element 35. The static element 31 is a screw nut corresponding in position to the installation hole 231, and is fixed to the sliding block 23. Two ends of the insertion element 32 are an inserting end 321 and a driving end 322, respectively. The insertion element 32 has a shoulder portion 323 disposed between the two ends of the insertion element 32. The sleeve 34 has a hollow core structure and has a head end 341 and a fixing end 342. The fixing end 342 has a receiving portion 343. The receiving portion 343 has an abutting surface 344. The driving end 322 penetrates the spring 33 and is inserted into the receiving portion 343, such that two ends of the spring 33 abut against the shoulder portion 323 and the abutting surface 344, respectively. The driving end 322 of the insertion element 32 penetratingly protrudes from the head end 341 to connect fixedly to the operating element 35. The positioning unit 30 is fixed to the installation hole 231 by the fixing end 342 of the sleeve 34.

The bag 40 comprises a receiving component 41, a flexible element 42, and four positioning portions 43. The rim of the receiving component 41 is coupled to the positioning portions 43 by the flexible element 42. In this embodiment, the flexible element 42 is a resilient band, whereas each said positioning portion 43 is a plate with a through hole 431.

Figure 3:
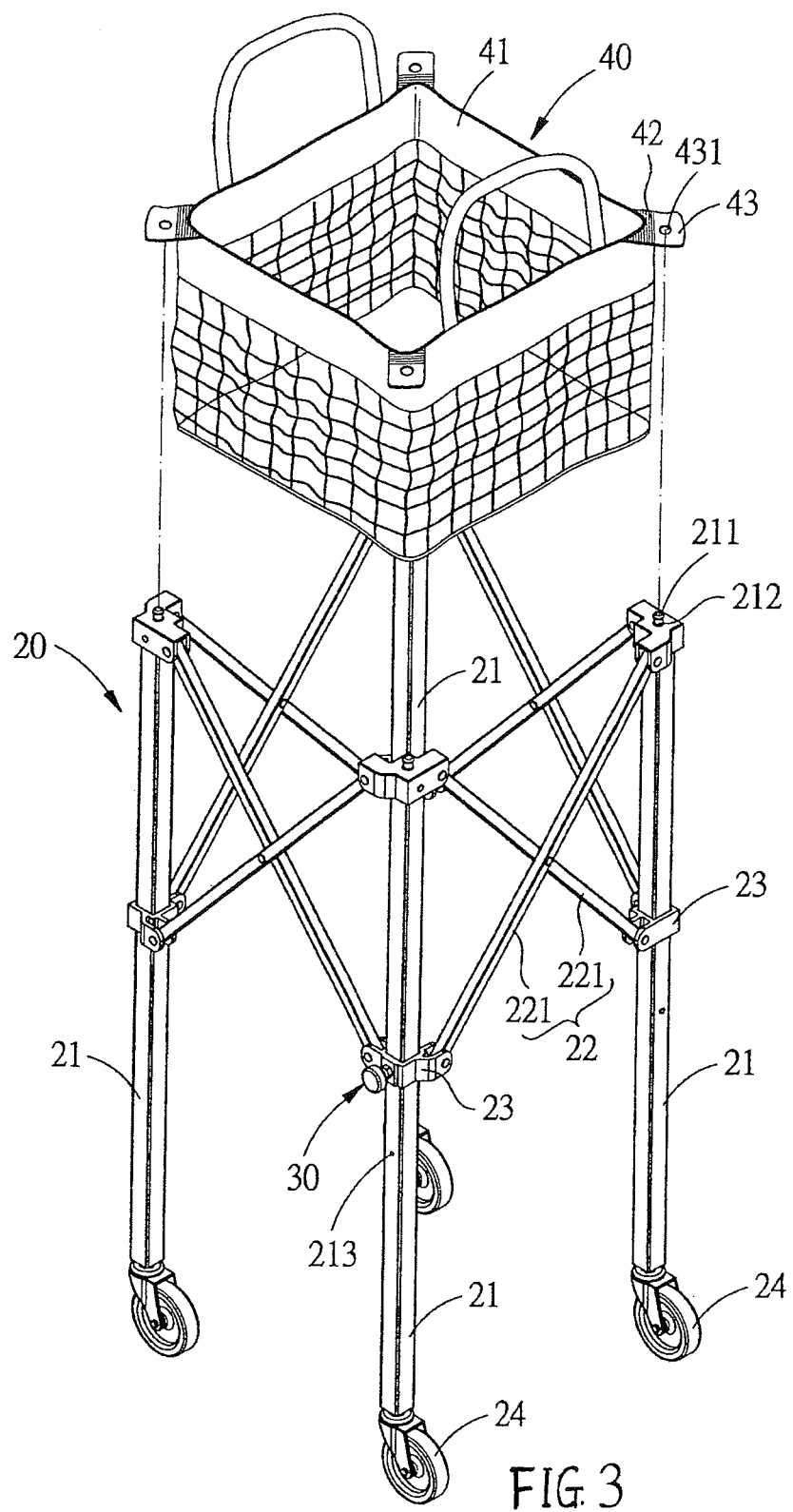
FIG. 3 is a perspective exploded view of a ball cart structure according to the present invention.
Figure 4:
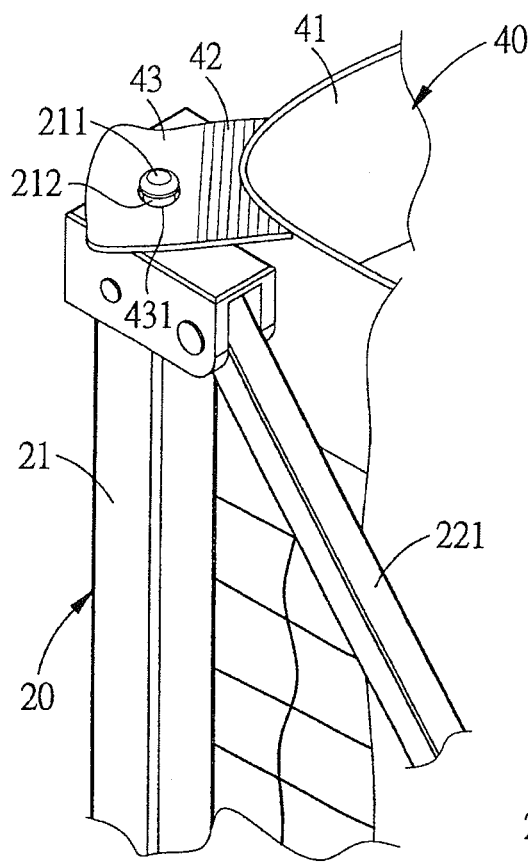
FIG. 4 is a partial schematic view of a bag and a frame according to the present invention.
Figure 5:
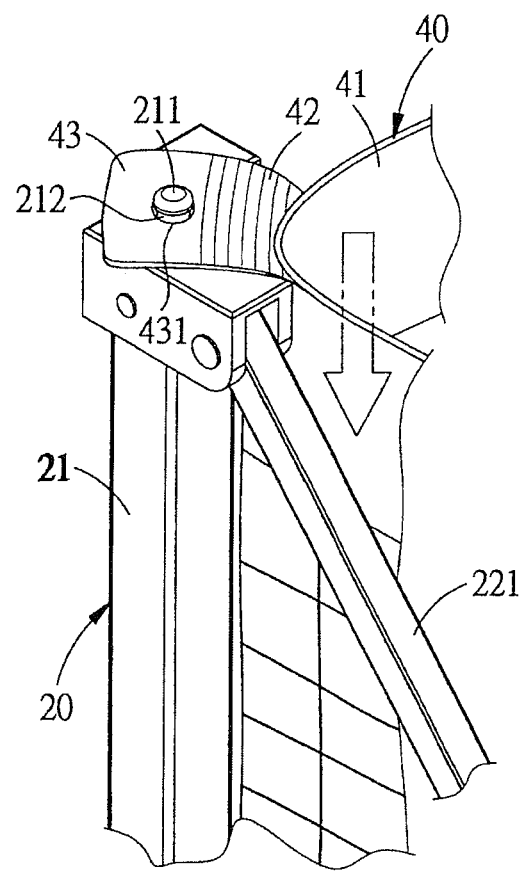
FIG. 5 is a partial schematic view of operation of the bag and the frame according to the present invention.
Figure 6:
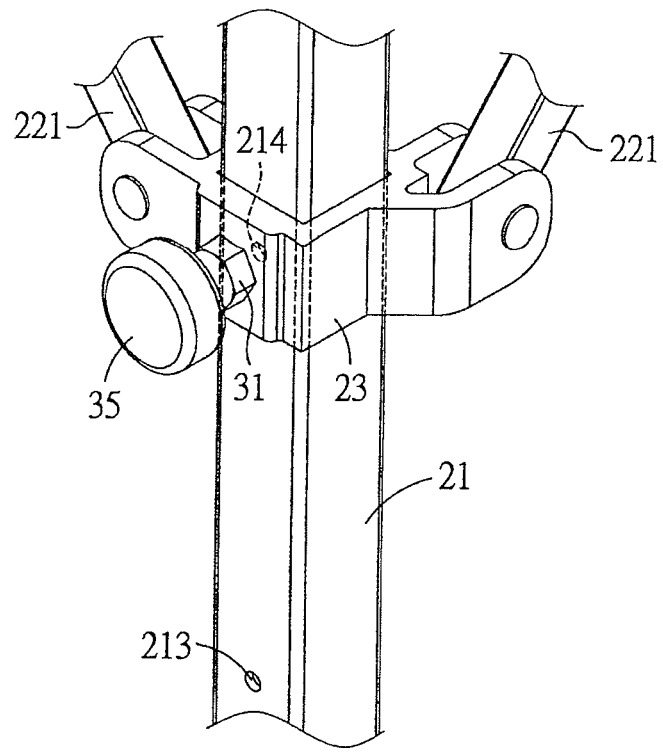
FIG. 6 is a partial schematic view of a positioning unit and a supporting rod according to the present invention.
Figure 7:
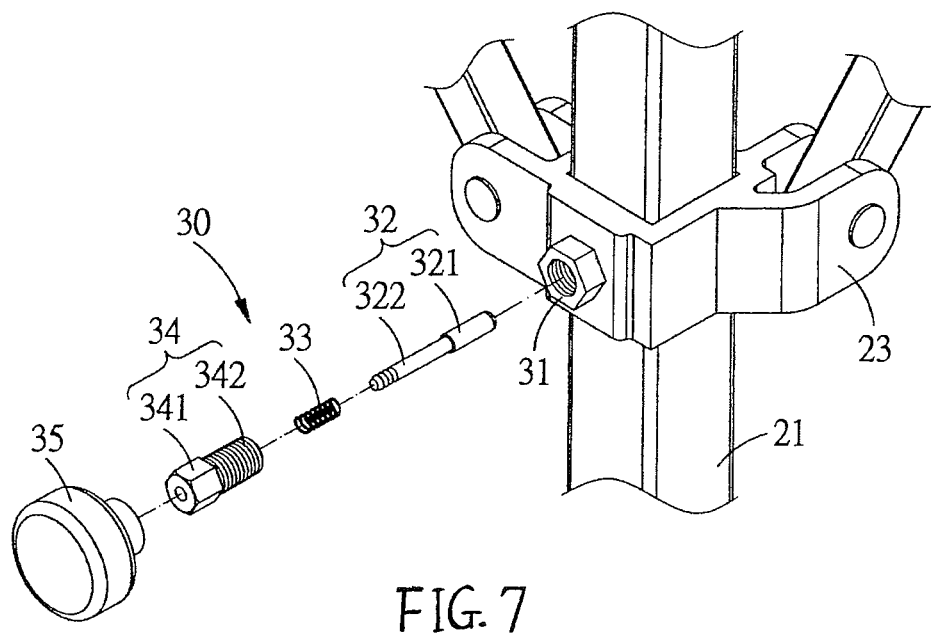
FIG. 7 is an exploded view of the positioning unit according to the present invention.
Figure 8:
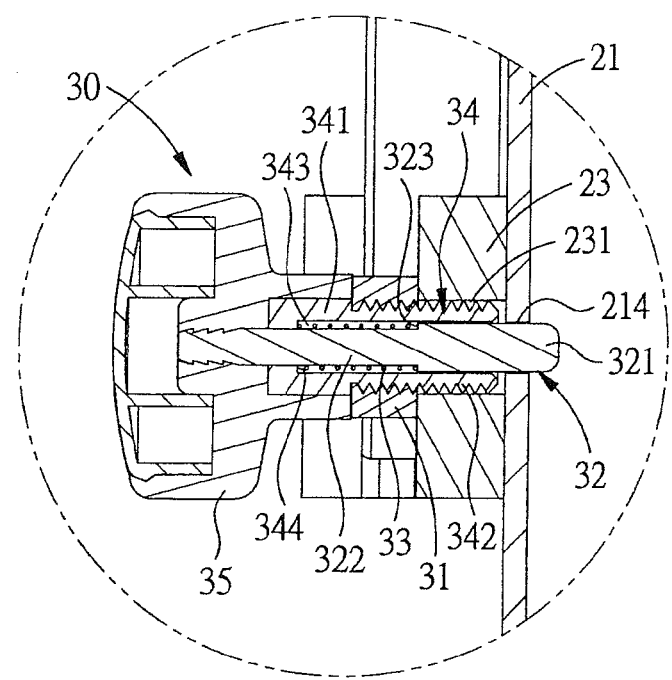
FIG. 8 is a cross-sectional view of the positioning unit coupled to the supporting rod and locked according to the present invention.
Figure 9:
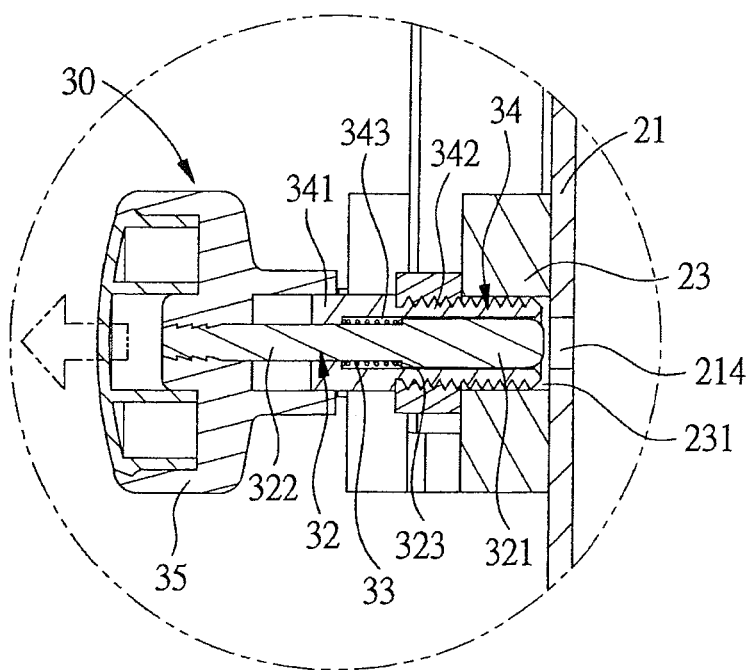
FIG. 9 is a cross-sectional view of the positioning unit coupled to the supporting rod and opened according to the present invention.
Figure 10:
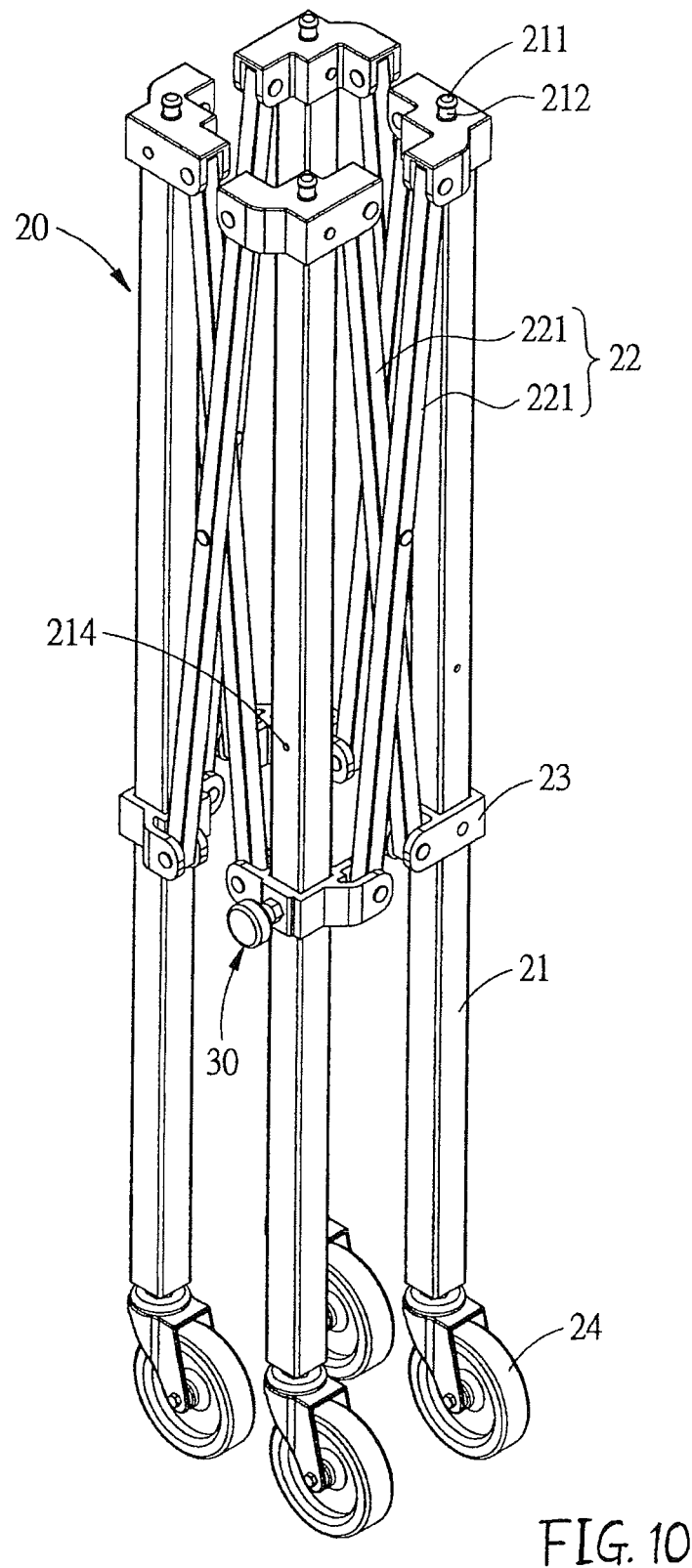
FIG. 10 is a schematic view of the frame folded according to the present invention.

The structure, configuration, and features of the ball cart structure of the present invention are described above. The operation of the ball cart structure of the present invention is illustrated with FIG. 3. Referring to FIG. 3, the frame 20 is unfolded, and the inserting end 321 of the insertion element 32 of the positioning unit 30 is inserted into and positioned at the second positioning hole 214. The sliding block 23 is restricted and positioned. Due to the through holes 431 of the positioning portions 43, the bag 40 is penetratedly coupled to the position-limiting protruding posts 211. Thus, not only is the bag 40 positioned on the frame 20, but the positioning portions 43 are also stopped at the position-limiting neck portions 212, respectively, thereby allowing the bag 40 to hold balls. Since the bag 40 is coupled to the positioning portions 43 by the flexible elements 42, the flexible elements 42 undergo flexible deformation and thereby bear a portion of the weight of the bag 40 whenever the bag 40 contains an article and thus bears the weight thereof. Hence, the structural strength of the positioning portions 43 of the bag 40 is maintained, thereby prolonging the service life of the ball cart structure.

To store the frame 20, a user pulls the operating element 35 to thereby drive the insertion element 32 to move in the direction away from the second positioning hole 214. The shoulder portion 323 compresses the spring 33, while the insertion element 32 is moving. The sliding block 23 loses its positioning capacity, as soon as the inserting end 321 of the insertion element 32 escapes from the second positioning hole 214. Meanwhile, the user can swing the fork-like rod sets 22 pivotally and thereby draw the supporting rods 21 closer to each other. The sliding blocks 23 slide along the supporting rods 21, respectively, and the ball cart structure folds eventually. The sliding blocks 23 slide and thus correspond in position to the first positioning holes 213 to thereby release the force otherwise pulling the operating element 35. At this point in time, the spring 33 restores its initial position, and, thus, the inserting end 321 of the insertion element 32 is inserted into the first positioning holes 213 and thereby fixed thereto. As indicated above, the present invention enables the positioning process to take place during an unfolded and operating state or a folded and stored state, prevents the ball cart structure from folding inappropriately while the ball cart structure is in use, enhances the user safety and stability of the ball cart structure, reduces the space required for the ball cart structure when the ball cart structure is folded and not in use, and renders it convenient to store the ball cart structure.

Figure 11:
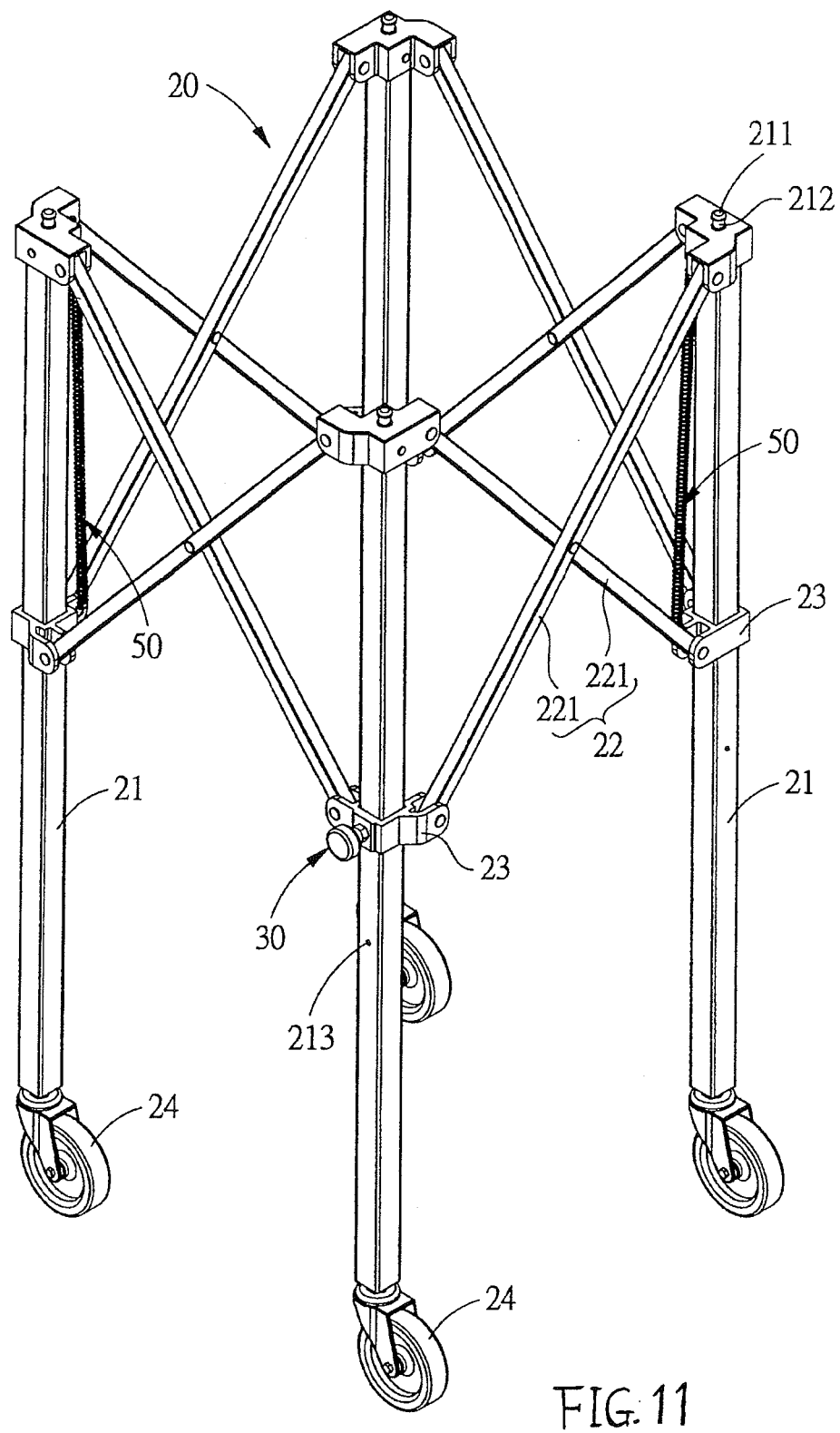
FIG. 11 is a schematic view of the frame equipped with a position restoring spring according to the present invention.
Figure 12:
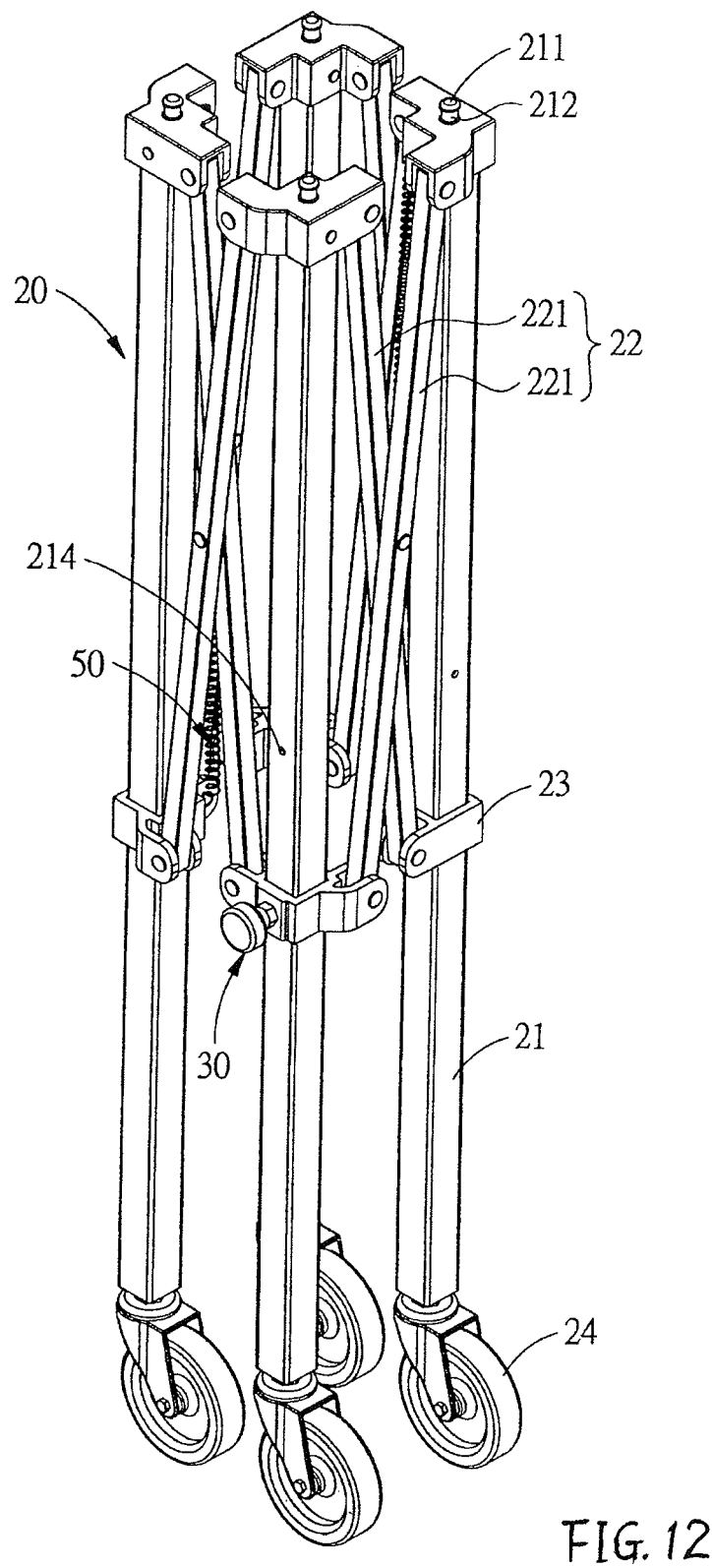
FIG. 12 is a schematic view of the frame equipped with a position restoring spring and folded according to the present invention.
Figure 13:
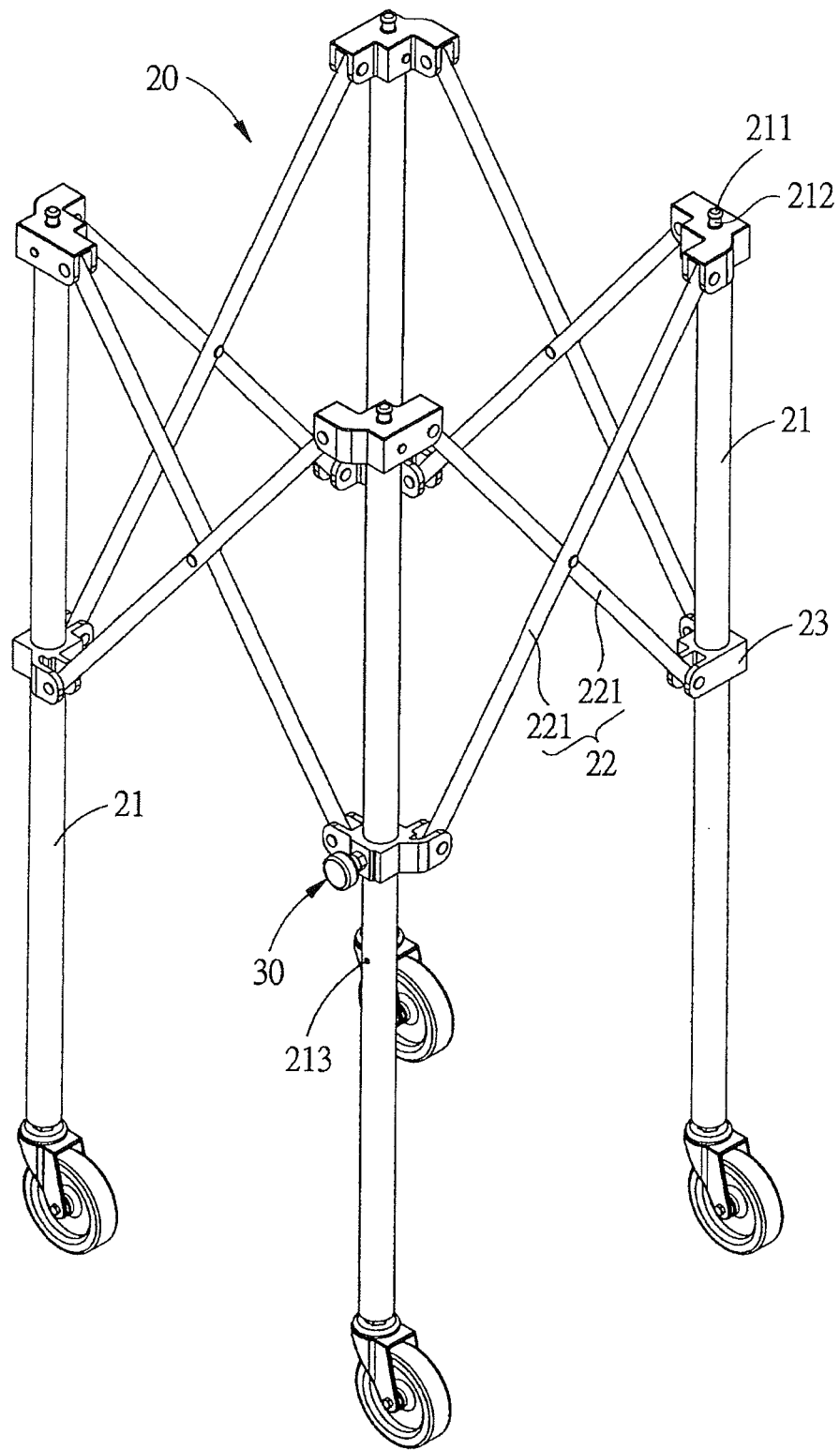
FIG. 13 is a schematic view showing that a supporting rod and a fork-like rod set are round rod elements according to the present invention.

Referring to FIG. 11, the two ends of a restoring spring 50 are fixed to the supporting rod 21 and the sliding block 23, respectively. Referring to FIG. 12, when the frame 20 is in a folded state, stretching the restoring spring 50 to store energy therein and then unfastening the positioning unit 30 to thereby unfold the frame 20 allows the restoring spring 50 to undergo resilient restoration and assists the fork-like rod sets 22 in unfolding rapidly to be in operation, thereby enhancing ease of use. In the aforesaid embodiment, the supporting rods 21 and the fork-like rod sets 22 are not only exemplified by square tubes, but can also come in the form of round rods as shown in FIG. 13 and still achieve the objectives and advantages of the aforesaid embodiment.

What is claimed is:

1. A ball cart structure, comprising:
a frame comprising four supporting rods arranged rectangularly and pivotally connected to four fork-like rod sets, respectively, with each supporting rod provided slidably with a sliding block having an installation hole, wherein an end of each supporting rod forms a position-limiting protruding post, with each said fork-like rod set disposed between two said supporting rods, with each fork-like rod set comprising two pivotal rods crossing each other and connecting pivotally to each other, wherein two ends of each said pivotal rod connect pivotally to a corresponding supporting rod and a corresponding sliding block, respectively, with each supporting rod having a first positioning hole and a second positioning hole;
a positioning unit disposed on each sliding block and comprising a static element, an insertion element, a spring, a sleeve, and an operating element, with the static element being a screw nut corresponding in position to the installation hole and fixed to the sliding block, with the insertion element having two ends, with the two ends being an inserting end and a driving end, respectively, with the insertion element having a shoulder portion disposed between the two ends of the insertion element, with the sleeve having a hollow core structure and having a head end and a fixing end, with the fixing end having a receiving portion, with the receiving portion having an abutting surface, wherein the driving end penetrates the spring and is inserted into the receiving portion, wherein two ends of the spring abut against the shoulder portion and the abutting surface, respectively, wherein the driving end of the insertion element penetratingly protrudes from the head end to connect fixedly to the operating element, and wherein the positioning unit is fixed to the installation hole by the fixing end of the sleeve, and
a bag comprising a receiving component, a flexible element, and four positioning portions, wherein a rim of the receiving component is coupled to the positioning portions of the sliding blocks by the flexible element, with each said positioning portion having a through hole, and with the bag being penetratedly coupled to the position-limiting protruding posts through the through holes.

2. The ball cart structure of claim 1, wherein the position-limiting protruding post has a position-limiting neck portion.

3. The ball cart structure of claim 1, wherein a pulley is disposed at another end of each supporting rod.

4. The ball cart structure of claim 1, wherein the flexible element is a resilient band.

* * * * *